US008582028B2

(12) United States Patent
Zeng

(10) Patent No.: US 8,582,028 B2
(45) Date of Patent: Nov. 12, 2013

(54) MULTI-MONITOR CONTROL

(75) Inventor: Henry Zeng, Sunnyvale, CA (US)

(73) Assignee: Synaptics Incorporated, San Jose, CA (US)

( * ) Notice: Subject to any disclaimer, the term of this patent is extended or adjusted under 35 U.S.C. 154(b) by 424 days.

(21) Appl. No.: 12/755,253

(22) Filed: Apr. 6, 2010

(65) Prior Publication Data
US 2011/0242425 A1 Oct. 6, 2011

(51) Int. Cl.
*H04N 5/66* (2006.01)
*H04N 9/12* (2006.01)

(52) U.S. Cl.
USPC .............................. 348/383; 345/1.3; 345/903

(58) Field of Classification Search
USPC ............ 348/383, 564, 706, 705; 345/1.1, 1.3
See application file for complete search history.

(56) References Cited

U.S. PATENT DOCUMENTS

| 5,166,801 | A | * | 11/1992 | Yoshikawa | 348/383 |
| 5,633,655 | A | * | 5/1997 | Hara | 345/698 |
| 5,734,446 | A | * | 3/1998 | Tokoro et al. | 348/745 |
| 2008/0055189 | A1 | * | 3/2008 | Wilk et al. | 345/1.3 |
| 2010/0177016 | A1 | * | 7/2010 | Zeng | 345/1.1 |
| 2010/0177017 | A1 | * | 7/2010 | Zeng et al. | 345/1.1 |

* cited by examiner

*Primary Examiner* — Michael Lee
(74) *Attorney, Agent, or Firm* — Osha Liang LLP

(57) ABSTRACT

A multi-monitor display is disclosed. A multi-monitor display receives a video data stream configured for a single H×V video display; splits the video data stream into a plurality of video data streams for transmission to a plurality of displays which, together, substantially span the H×V display.

19 Claims, 11 Drawing Sheets

| Lane 0 | Lane 1 | Lane 2 | Lane 3 | |
|---|---|---|---|---|
| BE | BE | BE | BE | |
| R0-9:2 | R1-9:2 | R2-9:2 | R3-9:2 | <-- Start |
| R0-1:0\|G0-9:4 | R1-1:0\|G1-9:4 | R2-1:0\|G2-9:4 | R3-1:0\|G3-9:4 | of |
| G0-3:0\|B0-9:6 | G1-3:0\|B1-9:6 | G2-3:0\|B2-9:6 | G3-3:0\|B3-9:6 | Active |
| B0-5:0\|R4-9:8 | B1-5:0\|R5-9:8 | B2-5:0\|R6-9:8 | B3-5:0\|R7-9:8 | Pixel |
| R4-7:0 | R5-7:0 | R6-7:0 | R7-7:0 | |
| G4-9:2 | G5-9:2 | G6-9:2 | G7-9:2 | |
| G4-1:0\|B4-9:4 | G5-1:0\|B5-9:4 | G6-1:0\|B6-9:4 | G7-1:0\|B7-9:4 | |
| B4-3:0\|R8-9:6 | B5-3:0\|R9-9:6 | B6-3:0\|R10-9:6 | B7-3:0\|R11-9:6 | |
| R8-5:0\|G8-9:8 | R9-5:0\|G9-9:8 | R10-5:0\|G10-9:8 | R11-5:0\|G11-9:8 | |
| G8-7:0 | G9-7:0 | G10-7:0 | G11-7:0 | |
| B8-9:2 | B9-9:2 | B10-9:2 | B11-9:2 | |
| B8-1:0\|R12-9:4 | B9-1:0\|R13-9:4 | B10-1:0\|R14-9:4 | B11-1:0\|R15-9:4 | |
| R12-3:0\|G12-9:6 | R13-3:0\|G13-9:6 | R14-3:0\|G14-9:6 | R15-3:0\|G15-9:6 | |
| G12-5:0\|B12-9:8 | G13-5:0\|B13-9:8 | G14-5:0\|B14-9:8 | G15-5:0\|B15-9:8 | |
| B12-7:0 | B13-7:0 | B14-7:0 | B15-7:0 | |

| Lane 0 | Lane 1 | Lane 2 | Lane 3 | |
|---|---|---|---|---|
| R1360-9:2 | R1361-9:2 | R1362-9:2 | R1363-9:2 | |
| R1360-1:0\|G1360-9:4 | R1361-1:0\|G1361-9:4 | R1362-1:0\|G1362-9:4 | R1363-1:0\|G1363-9:4 | |
| G1360-3:0\|B1360-9:6 | G1361-3:0\|B1361-9:6 | G1362-3:0\|B1362-9:6 | G1363-3:0\|B1363-9:6 | |
| B1360-5:0\|R1364-9:8 | B1361-5:0\|R1365-9:8 | B1362-5:0\|--- | B1363-5:0\|--- | |
| R1364-7:0 | R1365-7:0 | --- | --- | |
| G1364-9:2 | G1365-9:2 | --- | --- | |
| G1364-1:0\|B1364-9:4 | G1365-1:0\|B1365-9:4 | --- | --- | |
| B1364-3:0\|--- | B1365-3:0\|--- | --- | --- | <-- End |
| BS | BS | BS | BS | of |
| VB-ID | VB-ID | VB-ID | VB-ID | Active |
| Mvid7:0 | Mvid7:0 | Mvid7:0 | Mvid7:0 | Pixel |
| Maud7:0 | Maud7:0 | Maud7:0 | Maud7:0 | |

Figure 2B

MULTI-MONITOR CONTROL

BACKGROUND

1. Technical Field

The present invention is related to a multi-monitor control system and, in particular, a multi-monitor control system that does not need a frame buffer.

2. Discussion of Related Art

It is becoming more common to utilize multiple monitors. According to a survey by Jon Peddie Research cited in The New York Times, Apr. 20, 2006, it is estimated that use of multiple monitors can increase worker efficiency between 20 to 30 percent. Utilization of multiple monitors can also greatly enhance entertainment such as video gaming or movies.

However, obtaining multiple monitors typically requires multiple video graphics drivers, one for each monitor. Desktop computers, for example, may have multiple graphics cards or a graphics card with multiple drivers on the card. Notebook computers may include a PCMIA cardbus card or such to drive multiple monitors. Further, USB ports may be utilized to drive additional monitors.

However, these options are expensive to implement, require hardware upgrades for addition of each extra monitor, and usually consume large amounts of power. USB ports may also not have enough bandwidth, especially if other devices are also utilizing the port, to provide good resolution to the monitors.

Therefore, there is a need for systems that allow use of multiple monitors.

SUMMARY

Consistent with some embodiments of the present invention, a multi-monitor system can include a video receiver, the video receiver receiving a host video data stream appropriate for a video display of size H pixels by V rows; a plurality of video transmitters, each of the plurality of video transmitters providing a video data stream to display a portion of the video data on each of a corresponding plurality of video displays; and a splitter coupled between the video receiver and the plurality of video transmitters, the video receiver splitting the host video data stream from the video receiver into the video data stream for each of the plurality of video display to display the portions of the video data to each of the plurality of video transmitters, wherein during the time that a first monitor of the plurality of video displays is receiving active video data, the remaining monitors of the plurality of video displays are in a blanking period.

A method of providing a multi-monitor display according to some embodiments of the present invention includes receiving a video data stream configured for a single video display of size H pixels by V rows; splitting the video data stream into a plurality of data streams; and transmitting the plurality of data streams to a corresponding plurality of displays.

Both receiving and transmitting data may be performed according to the DisplayPort standard. These and other embodiments will be described in further detail below with respect to the following figures.

BRIEF DESCRIPTION OF THE DRAWINGS

FIG. 2B illustrate packing of pixel data in RGB format according to the DisplayPort standard.

Figure 1:
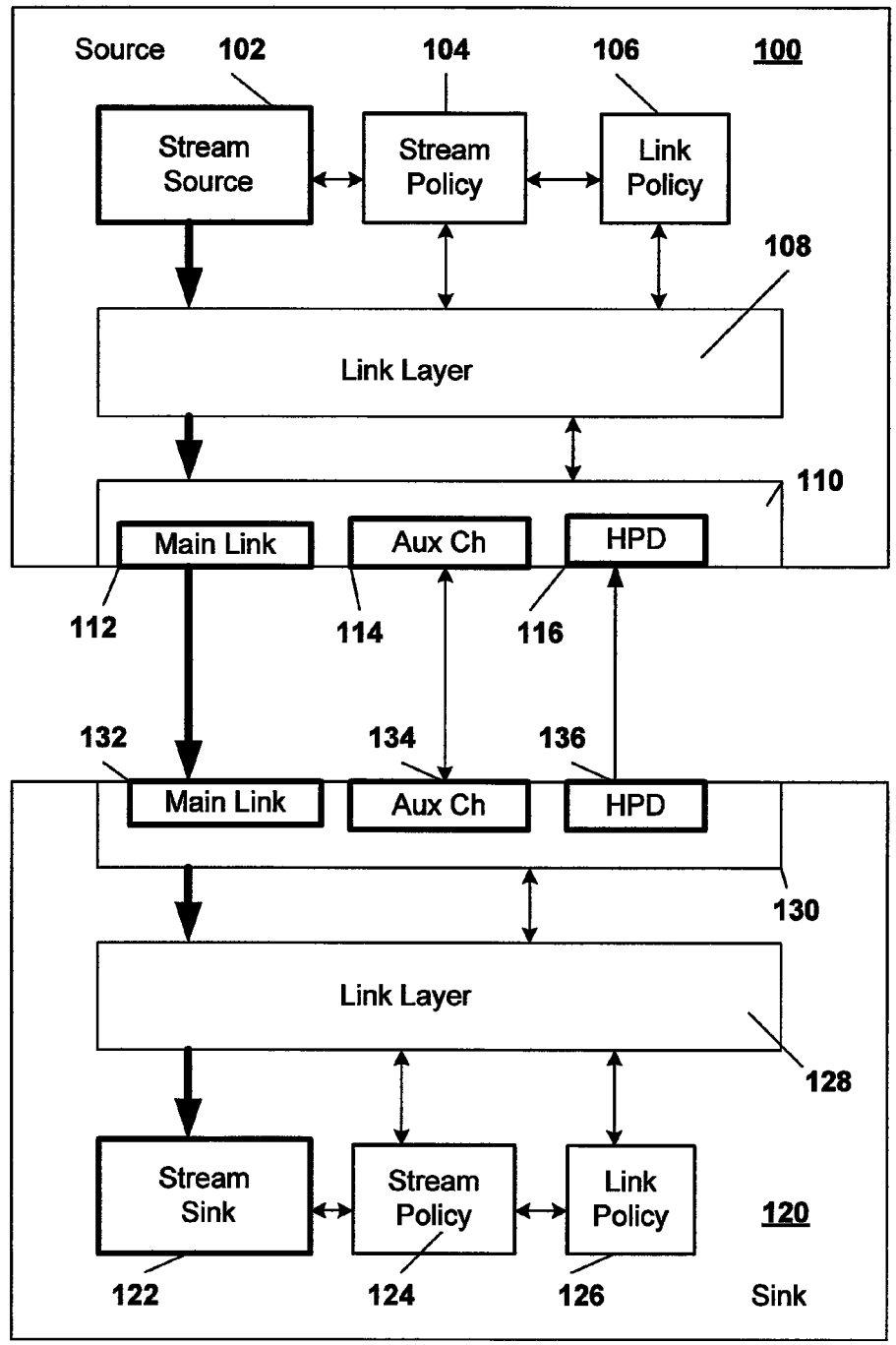
FIG. 1 illustrates aspects of a DisplayPort standard.

In the drawings, elements having the same designation have the same or similar functions.

DETAILED DESCRIPTION

In the following description specific details are set forth describing certain embodiments of the invention. It will be apparent, however, to one skilled in the art that the present invention may be practiced without some or all of these specific details. The specific embodiments presented are meant to be illustrative of the present invention, but not limiting. One skilled in the art may realize other material that, although not specifically described herein, is within the scope and spirit of this disclosure.

For illustrative purposes only, embodiments of the invention applicable to the VESA DisplayPort Standard are described below. The VESA DisplayPort Standard, Version 1, Revision 1a, released Jan. 11, 2008, which is available from the Video Electronics Standard Association (VESA), 860 Hillview Court, Suite 150, Milpitas, Calif. 95035, is herein incorporated by reference in its entirety. One skilled in the art will recognize that embodiments of the present invention can be utilized with other video display standards.

The DisplayPort (DP) standard is illustrated in FIG. 1. FIG. 1 shows a video source 100 in communication with a video sink 120. Source 100 is a source of video data. Sink 120 receives the video data for display. Data is transmitted between source 100 and sink 120 through three data links: a main link, an auxiliary channel, and a hot plug detect (HPD). Source 100 transmits the main link data between main link 112 of source 100 and main link 132 of sink 120, which are high bandwidth forward transmission links. Auxiliary channel data is transmitted between auxiliary channel 114 of source 100 and auxiliary channel 134 of sink 120, which are bi-direction auxiliary channels. HDP data is transmitted between HDP 116 of source 100 and HDP 136 of sink 136.

The DP standard currently provides for up to 10.8 Gbps (giga bits per second) through main link 112, which may support greater than QXGA (2048×1536) pixel formats, and greater than 24 bit color depths. Further, the DP standard currently provides for variable color depth transmissions of 6, 8, 10, 12, or 16 bits per component. In accordance with the DP standard, bi-directional auxiliary channel 114 provides for up to 1 Mbps (mega bit per second) with a maximum latency of 500 micro-seconds. Furthermore, a hot-plug detection channel 116 is provided. The DP standard provides for a minimum transmission of 1080p lines at 24 bpp at 50/60 Hz over 4 lanes at 15 meters.

Additionally, the DP standard supports reading of the extended display identification data (EDID) whenever sink 120 (which typically includes a display, but may also be a repeater or a duplicator) is connected to power. Further, the DP standard supports display data channel/command interface (DDC/CI) and monitor command and controls set (MMCS) command transmission. Further, the DP standard supports configurations that do not include scaling, a discrete display controller, or on screen display (OSD) functions.

The DP standard supports various audio and visual content standards. For example, the DP standard supports the feature sets defined in CEA-861-C for transmission of high quality uncompressed audio-video content, and CEA-931-B for the transport of remote control commands between sink 120 and source 100. Although support of audio aspects is not important to embodiments of the present invention, the DP standard supports up to eight channels of linear pulse code modulation (LPCM) audio at 192 kHz with a 24 bit sample size. The DP standard also supports variable video formats based on flexible aspect, pixel format, and refresh rate combinations based on the VESA DMT and CVT timing standards and those timing modes listed in the CEA-861-C standard. Further, the DP standard supports industry standard colorimetry specifications for consumer electronics devices, including RGB and YCbCr 4:2:2 and YCbCr 4:4:4.

As shown in FIG. 1, data is provided by stream source 102 to a link layer 108. Link layer 108 is coupled to provide data to physical layer 110. The data provided by stream source 102 can include video data. Link layer 108 packs the video data into one or more lanes and transmits the data to physical layer 110. Main link 112, auxiliary channel 114, and HPD 116 are included in the physical layer, which provides the signaling to transmit data to sink 120.

Sink 120 also includes a physical layer 130, which includes main link 132, auxiliary channel 134, and HPD 136, a link layer 128, and a stream sink 122. Stream sink 122 can, for example, be a video display and the data provides line and frame format associated with displaying video. Physical layer 130 receives the signals from physical layer 110, typically over a cable, and recovers data that had been transmitted by source 100. Link layer 128 receives the recovered data from physical layer 130 and provides video data to stream sink 122. Stream policy 104 and link policy 106 provide operating parameters to link layer 108. Similarly, stream policy 124 and link policy 126 provide policy data to link layer 128.

As discussed above, source 100 includes a physical layer 110 that includes main link 112, auxiliary channel 114, and HDP 116. Correspondingly, sink 120 includes a physical layer 130 with a main link 132, an auxiliary channel 134, and HDP 136. A cable and appropriate connectors are utilized to electronically couple main link 112 with main link 132, auxiliary channel 114 with auxiliary channel 134, and HDP 116 with HDP 136. In accordance with the DP standard, main link 112 transmits one, two, or four lanes that support 2.7 Gbps and 1.62 Gbps per lane, which is determined by the quality of the connection between main link 112 and main link 132. Physically, each lane can be an ac-coupled, doubly terminated differential pair of wires.

The number of lanes between main link 112 and main link 132 is one, two, or four lanes. The number of lanes is decoupled from the pixel bit depth (bpp) and component bit depth (bpc). Component bit depths of 6, 8, 10, 12, and 16 bits can be utilized. All of the lanes carry data and therefore the clock signal is extracted from the data stream. The data stream is encoded with the ANSI 8B/10B coding rule (ANSI X3.230-1994, clause 11).

Figure 2A:
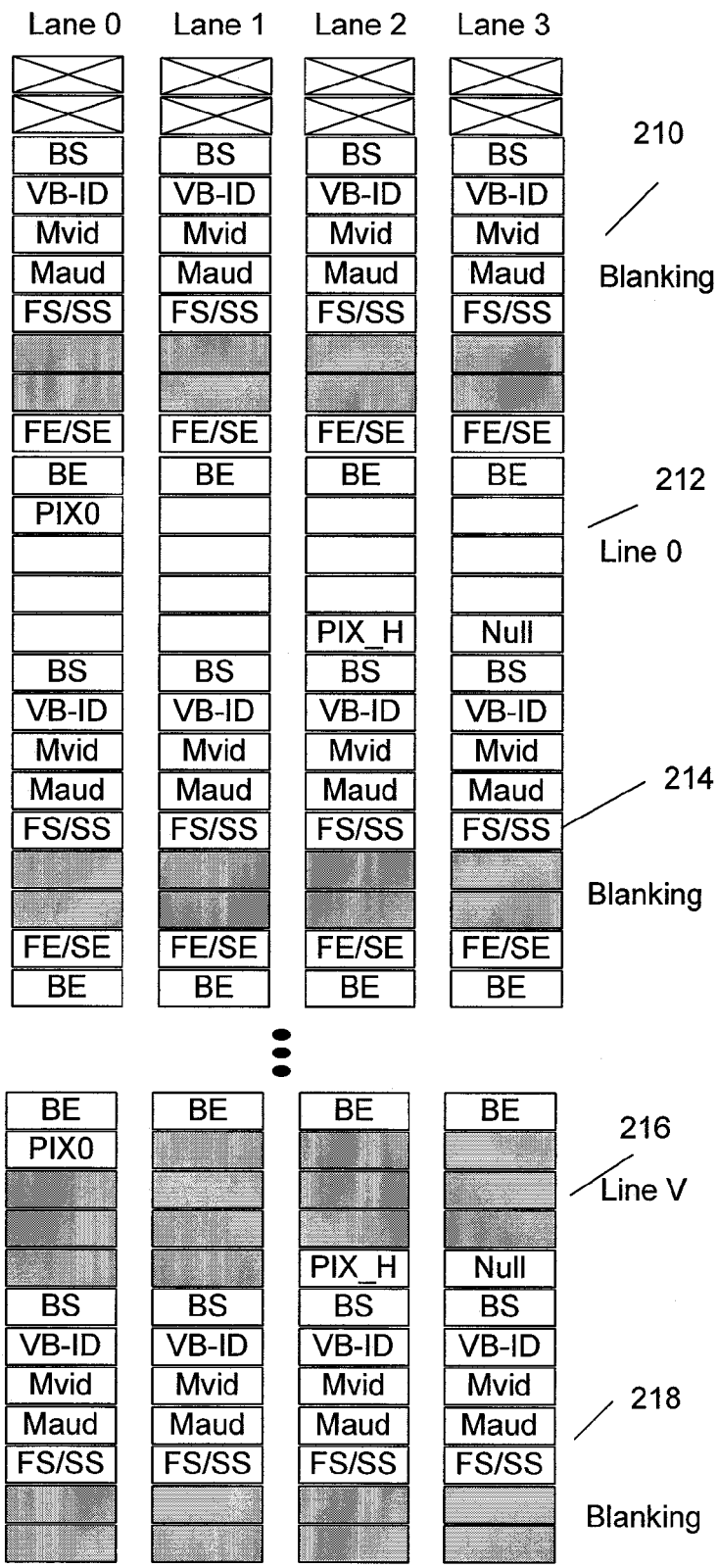
FIG. 2A illustrates transmission of an image according to the DisplayPort standard.

FIG. 2A illustrates transmission of a video image of size H×V (H pixels by V lines) according to the DisplayPort standard. Although a four-lane example is shown in FIG. 2A, other lane configurations are similarly arranged. A data slot in each of the four lanes is transmitted each clock cycle. As shown in FIG. 2A, image data is sent after a horizontal blanking period 210. The horizontal blanking period 210 begins with a blanking Start (BS) symbol transmitted in each of the four lanes. Symbols transmitted before the BS symbol can be fill or can be previous image or audio data, but are not relevant for this discussion.

Following the BS symbol transmissions, a video blanking ID (VB-ID), a video time stamp (MVID), and an audio time stamp (MAUD) are sent. VB-ID includes a flag that is set to indicate whether or not a vertical blanking period exists. In this case, VB-ID should be set to indicate active video data. Prior to the start of transmission of the video image, VB-ID is likely to have been set to a blanking step indicating a vertical blanking period. MVID indicates a video time stamp, which is utilized for stream clock recovery. MAUD indicates an audio time stamp if the blanking period is utilized to transmit audio data. As shown in FIG. 2A, a fill start (FS) or secondary data start (SS) symbol is sent. If there is audio data (indicated by a non-zero MAUD), then the audio data can be transmitted. IF not, then fill data is transmitted until the blanking period is over, at which time a fill end (FE) or secondary data end (SE) symbol is sent in each of the lanes and a blanking end (BE) symbol is sent in the lanes immediately following the FE or SE symbols.

Following transmission of the BE symbol in each of the lanes, video data 212 is transmitted. Video data is in the form of pixels, which are packed into the four lanes. Pixels may be sequentially distributed across lanes starting with pixel 0 (PIX0) and ending with pixel H (PIX_H), as shown in FIG. 2A. The pixels are similarly packed across each of the lanes until the last pixel of the line is inserted. As shown in FIG. 2A, the last pixel in the line is often such that not all slots in all the lanes are filled. In the example shown in FIG. 2A, lane 3 is not filled. Unused slots can be padded, for example with nulls. Immediately following transmission of a line, another blanking period, period 214 begins. Blanking period 214 represents a horizontal blanking period. Again, audio data may be sent or the slots in each of the lanes filled.

Each line, line 0 through line V in an H×V transmission, is then transmitted. During each of the blanking periods between transmission of Line 0 data 212 and Line V data 216, VB-ID is set to indicate active video data. When Line V video data 218 has been transmitted, a BS symbol is again transmitted across each of the lanes. The following VB-ID symbol is now set to indicate a vertical blanking period and MVID is set to 0, indicating no video data present. Audio data may still be transmitted, if present. Transmission begins again at blanking period 210 for transmission of the next image.

FIG. 2B illustrates an example encoding of 30 bpp RGB (10 bpc) 1366×768 video data into a four lane, 8-bit, link. As also illustrated in FIG. 2A, one data slot in each lane is transmitted per clock cycle. In the figure, R0-9:2 means the red bits 9:2 of pixel 0. G indicates green, and B indicates blue. BS indicates a blanking start and BE indicates a blanking end. Mvid 7:0 and Maud 7:0 are portions of the time stamps for video and audio stream clocks. As is indicated in FIG. 2, the encoding into four lanes occurs sequentially by pixel, with pixel 0 of the line being placed in lane 0, pixel 1 in line 1, pixel 2 in line 2, and pixel 3 in lane 3. Pixels 4, 5, 6, and 7 are then placed in lanes 0, 1, 2, and 3. The same packing scheme is utilized regardless of the number of lanes used by source 100. Source 100 and sink 120 may support any of 1, 2, or 4 lanes under the DP standard. Those that support 2 lanes also support single lanes and those that support 4 lanes support both 2 lane and 1 lane implementations.

Although FIG. 2B demonstrates a packing in four lanes of RGB video data, video data in other formats (e.g., YCrCb) can be similarly packed into 1, 2, or 4 lanes under the DisplayPort standard. FIGS. 2A and 2B illustrate an example of a four lane transmission of data. However, data may be transmitted over one lane or two lanes as well. The order of the transmission is the same as illustrated in FIG. 2A and the pixel packing scheme illustrated in FIG. 2B can be utilized with one or two lanes as well as with four lanes.

Auxiliary channel 114, which is coupled by cable with auxiliary channel 134 in sink 120, according to the DP standard includes an ac-coupled, doubly terminated differential pair. The clock can then be extracted from the data stream passing between auxiliary channel 114 and auxiliary channel 134. The auxiliary channel is half-duplex, bi-directional with source 100 being the master and sink 120 being the slave. Sink 120 can provide an interrupt by toggling the HDP signal coupled between HDP 116 and HDP 136.

Physical layer 110, which includes output pins and connectors for main link 112, auxiliary channel 114, and HDP 116, includes the physical transmit and receive circuits for passing signals between source 100 and sink 120. Similarly, physical layer 130, including main link 132, auxiliary channel 134, and HDP 136, includes the transmit and receive circuits for receive data and communicating with source 100.

Link layer 108 of source 100 maps the audio and visual data streams into the lanes of main link 112 as indicated in FIGS. 2A and 2B so that data can be retrieved by link layer 128 of sink 120. Further, link layer 108 interprets and handles communications and device management over auxiliary channel 114 and monitors HPD 116. Link layer 108 of source 100 corresponds with link layer 128 of sink 120. Among the tasks fulfilled in link layer 108 and link layer 128 is the determination of the number of lanes available and the data rate per lane. An initialization sequence is utilized to determine these parameters once link layer 108 detects a hot plug through HPD 116. Further, link layer 108 is responsible for mapping data into main link 112 for transport to main link 132. Mapping includes packing or unpacking, stuffing or unstuffing, framing or unframing, and inter-lane skewing or unskewing in link layer 108 and link layer 128, respectively. Link layer 108 reads the capability of sink device 120, the EDID, the link capability, and the DPCD, in order to determine the number of lanes and the pixel size of the display device associated with sink 120. Link layer 128 is also responsible for clock recovery from both auxiliary channel 114 and main link 112.

Further, link layer 108 is responsible for providing control symbols. As shown in FIG. 2A, a blanking start (BS) symbol is inserted after the last active pixel. The BS symbol is inserted in each active lane directly after the last pixel is inserted. Directly following the BS symbol, a video blanking ID (VB-ID) word is inserted. The VB-ID word can include a vertical blanking flag, which is set to 1 at the end of the last active line and remains one throughout the vertical blanking period, a Field ID flag, which is set to 0 right after the last active line in the top field and 1 right after the last active line of the bottom field, an interlace flag, which indicates whether the video stream is interlaced or not, a no video stream flag, which indicates whether or not video is being transmitted, and an audio-mute flag, which indicates when audio is being muted. MVID and MAUD provide timing synchronization between audio and video data.

Although the DP standard is specific with regard to data transmission, some of which is described above, embodiments consistent with the present invention may be utilized with other specifications. The DP standard has been described here in some specificity only as a framework in which some embodiments consistent with the present invention can be described.

Figure 3:
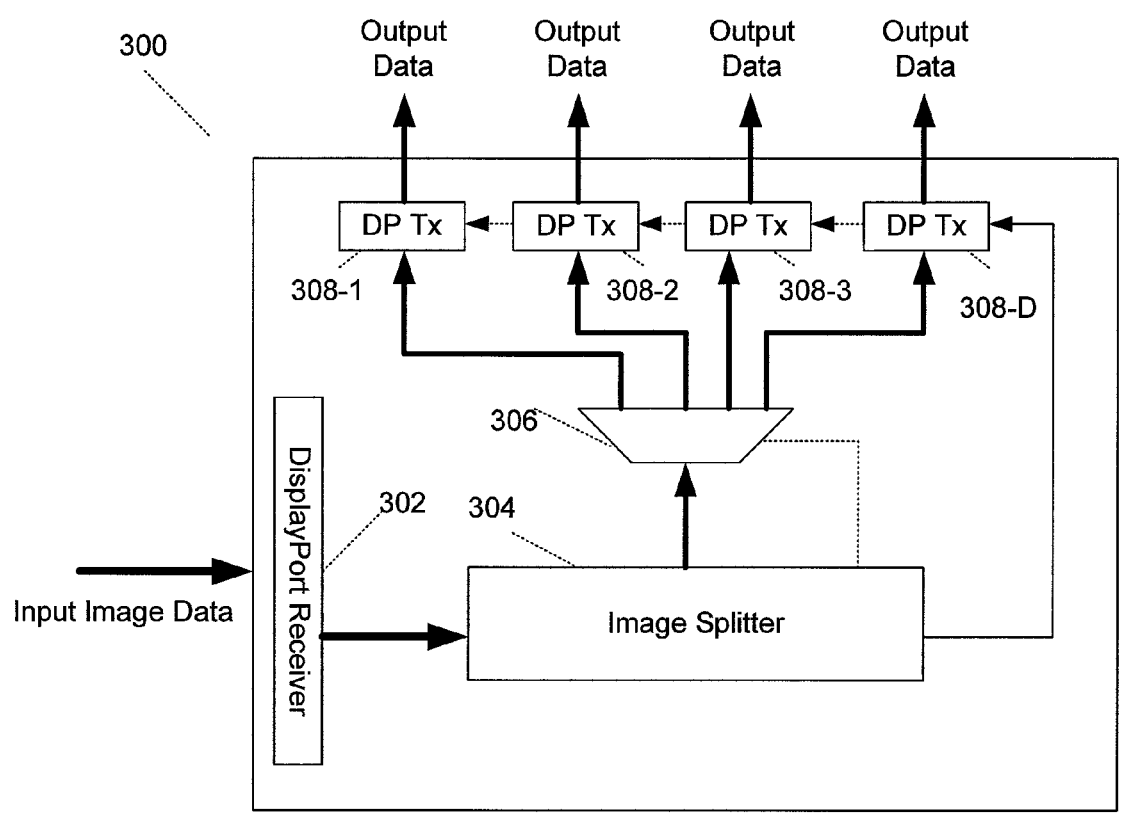
FIG. 3 illustrates a multi-monitor system consistent with the present invention.

FIG. 3 illustrates a multi-monitor system 300 consistent with embodiments of the present invention. As shown in FIG. 3, multi-monitor system 300 receives video data from source 100 into receiver (RX) 302. As such, consistently with the DisplayPort standard, RX 302 includes the main link data, the auxiliary channel data, and the HPD data as described above. RX 302 receives the data and provides that data to an image splitter 304. RX 302 also interacts with source 100 so that source 100 operates as if multi-monitor system 300 is a DisplayPort compatible sink with a single H×V display device. As such, multi-monitor controller 300 interacts with source 100 in the same fashion as sink 120 shown in FIG. 1. Further, multi-monitor controller 300 appears to source 100 as a single display device of resolution H×V.

Image splitter 304 receives video data from receiver 302 and splits the video data stream into separate data streams for transmission to multiple displays through transmitters 308-1 through 308-D. Such a splitting can be accomplished without the use of a video framer by directing the video data into the corresponding D video streams and controlling blanking periods in each of the individual displays.

In general, an image splitter consistent with the present invention can split an H×V sized video data into any number of separate displays that substantially span the video data in that they either display substantially all or all of the video data on a plurality of displays. Although some embodiments may include a total of H pixels horizontally and V pixels vertically (i.e., V rows of H pixels), so that the received video data is completely displayed, in some embodiments the H×V sized video data may be padded or cropped accordingly to fit on a plurality of displays of differing size.

The image data input to multi-monitor controller 300 can, according to the DisplayPort standard, be transmitted in 1, 2, or 4 lane format. The image data output from multi-monitor controller 300 can similarly be transmitted in 1, 2, or 4 lane format. FIGS. 4A through 4D illustrate graphically the transmission of data out of multi-monitor controller 300 to multiplexer 306 and finally to transmitters 308-1 through 308-D in a four-monitor system arranged in a 2×2 square. One skilled in the art will recognize from this description that any number of monitors arranged in any pattern that fills a rectangle can be utilized.

Figure 4A:
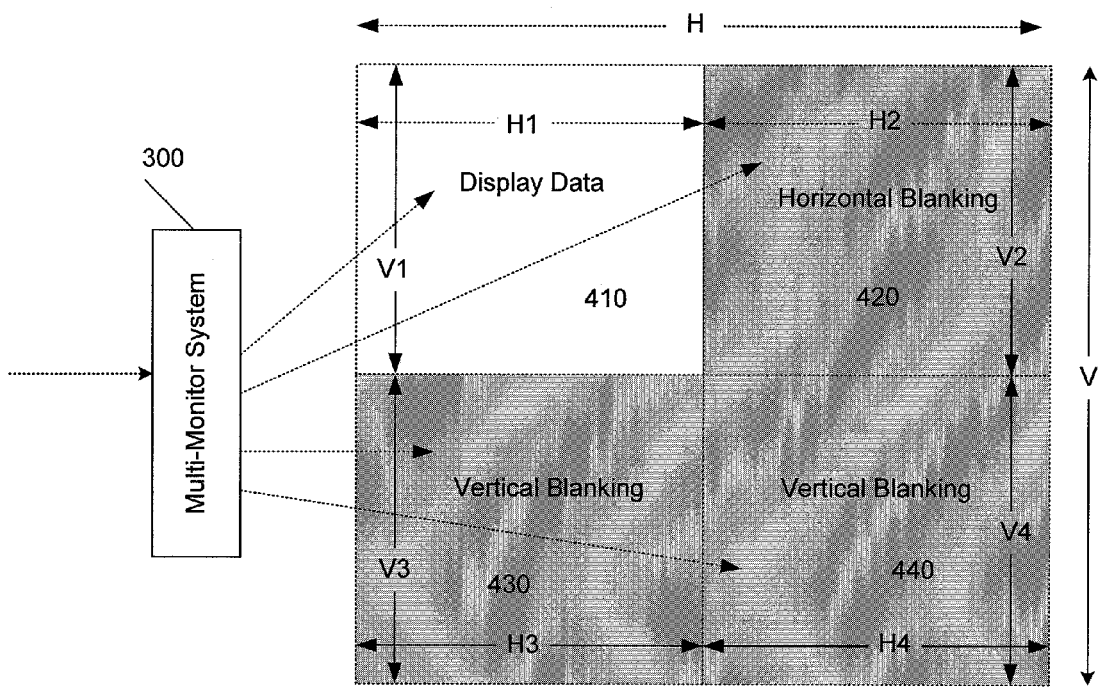
FIGS. 4A through 4D illustrate presentation of video data on an array of monitors according to some embodiments of the present invention.

As shown in FIG. 4A, multi-monitor system 300 is coupled to four monitors, monitors 410, 420, 430, and 440. Monitors 410, 420, 430, and 440 are arranged in a 2×2 pattern of overall dimensions H×V. Monitor 410, however, is of dimension H1×V1; monitor 420 is of dimension H2×V2; monitor 430 is of dimension V3×H3; and monitor 440 is of dimension H4×V4. Monitors 410, 420, 430, and 440 can be of any relative sizes such that, when arranged, they include a rectangle substantially of dimensions H×V. In some embodiments, then, H1+H2=H3+H4=H and V1+V3=V2+V4=V. However, in some embodiments these relations do not hold.

Figure 4B:
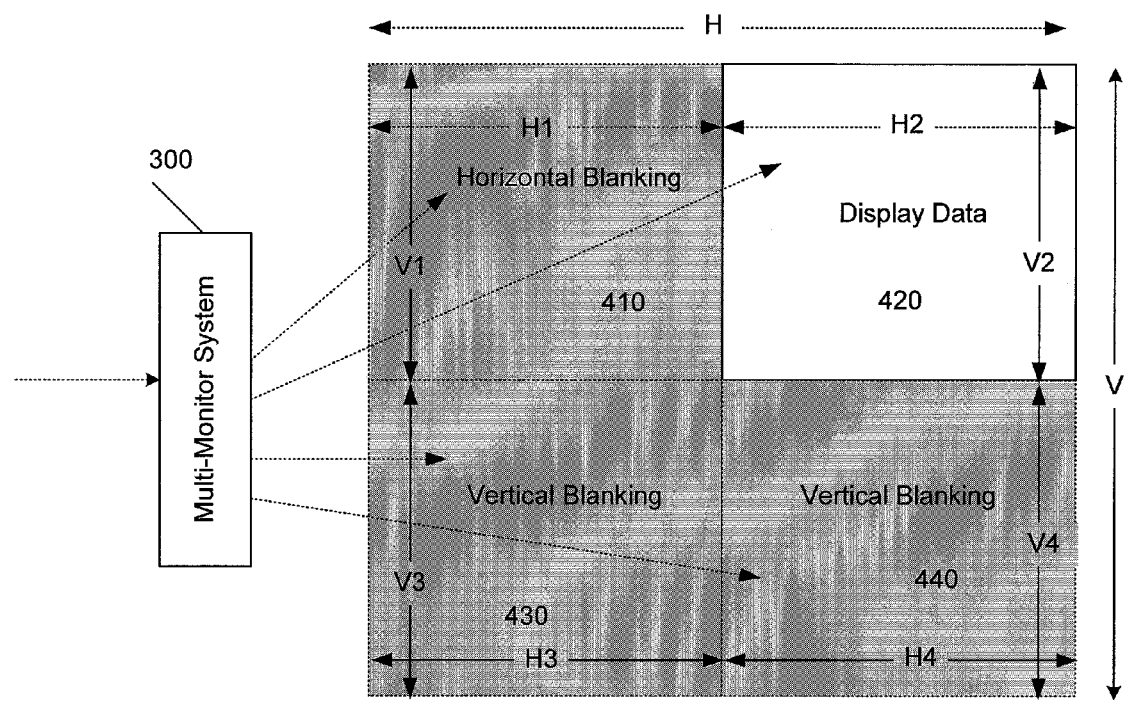
Figure 4C:
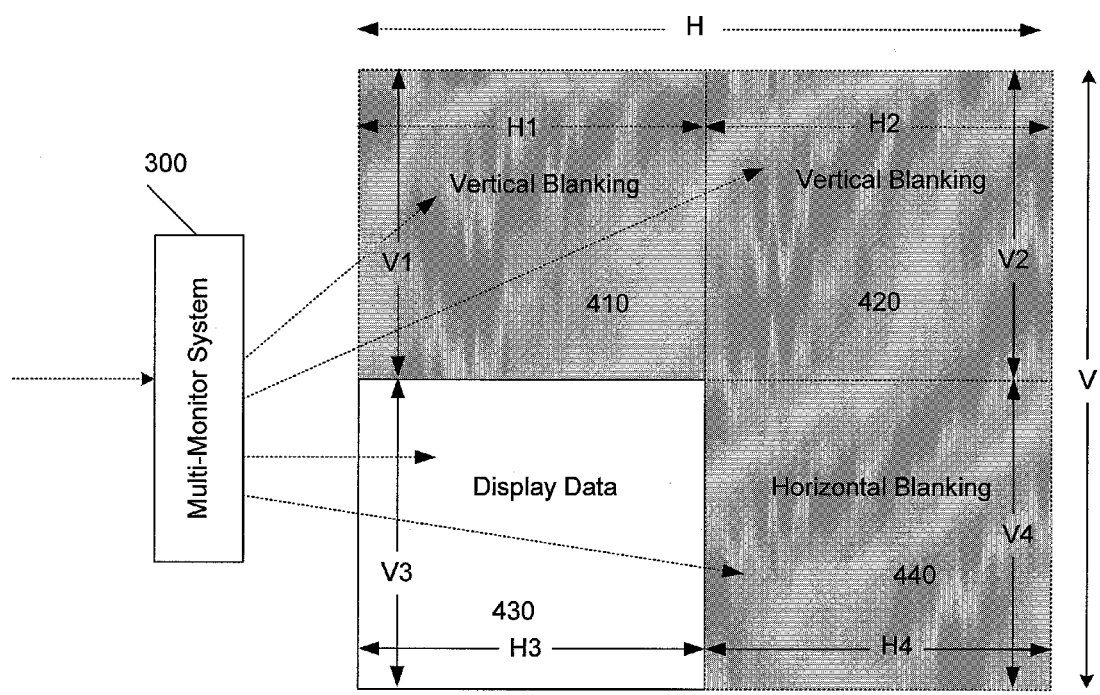
Figure 4D:
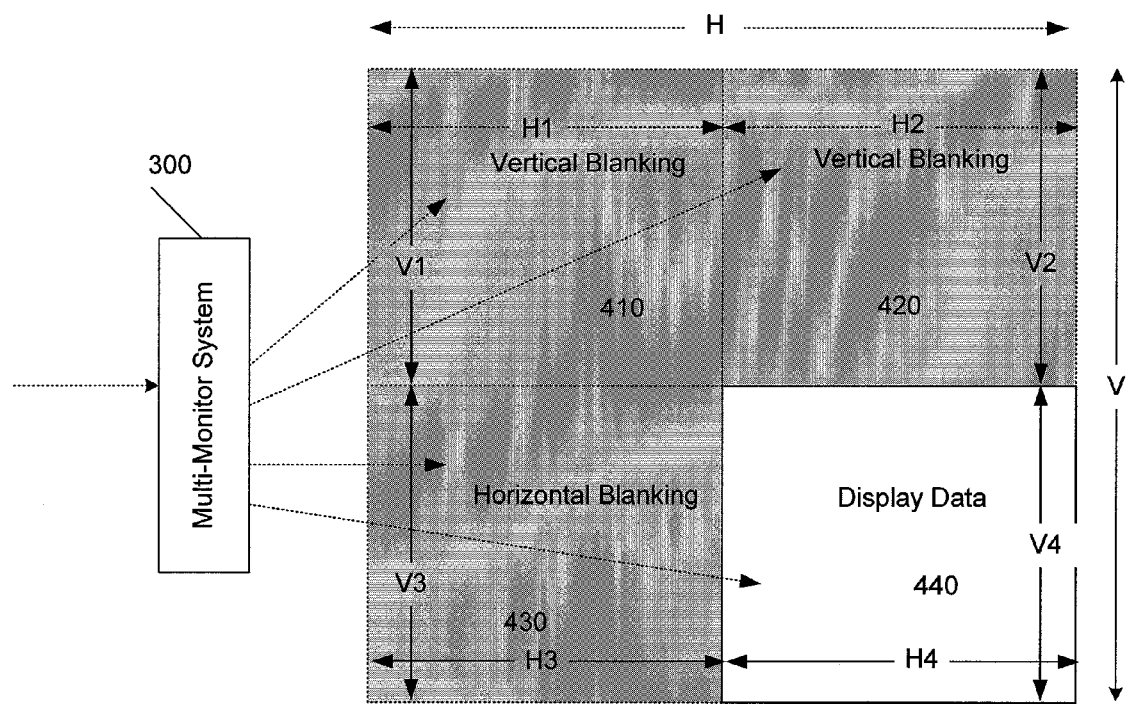

As shown in FIG. 4A, during the time that monitor 410 is displaying active data, monitor 420 is in a horizontal blanking period while monitors 430 and 440 are in vertical blanking periods. As shown in FIG. 4B, during the time that monitor 420 is displaying active data, monitor 410 is in a horizontal blanking period while monitors 430 and 440 are in vertical blanking periods. As shown in FIG. 4C, during the time that monitor 430 is displaying active data, monitor 440 is in a horizontal blanking period and monitors 410 and 420 are in a vertical blanking period. As shown in FIG. 4D, during the time that monitor 440 is displaying active data, monitor 430 is in a horizontal blanking period and monitors 410 and 420 are in a vertical blanking period. Multi-Monitor system 300, then, provides compatible data streams to each of the monitors.

In some embodiments, there can be any number of monitors arranged in any fashion. While video data is being sent to a row in any one of the monitors, other monitors that share that row can be in a horizontal blanking period while monitors that do not share that row can be in a vertical blanking period. Data is sent row by row, so blanking is coordinated between separate monitors that include that row. In that fashion, video data can be retrieved from source 100 and directed to individual data streams to be displayed across the monitor without the need for a frame buffer. Instead, data is directed from the incoming stream of data to the outgoing data streams appropriately.

Figure 5A:
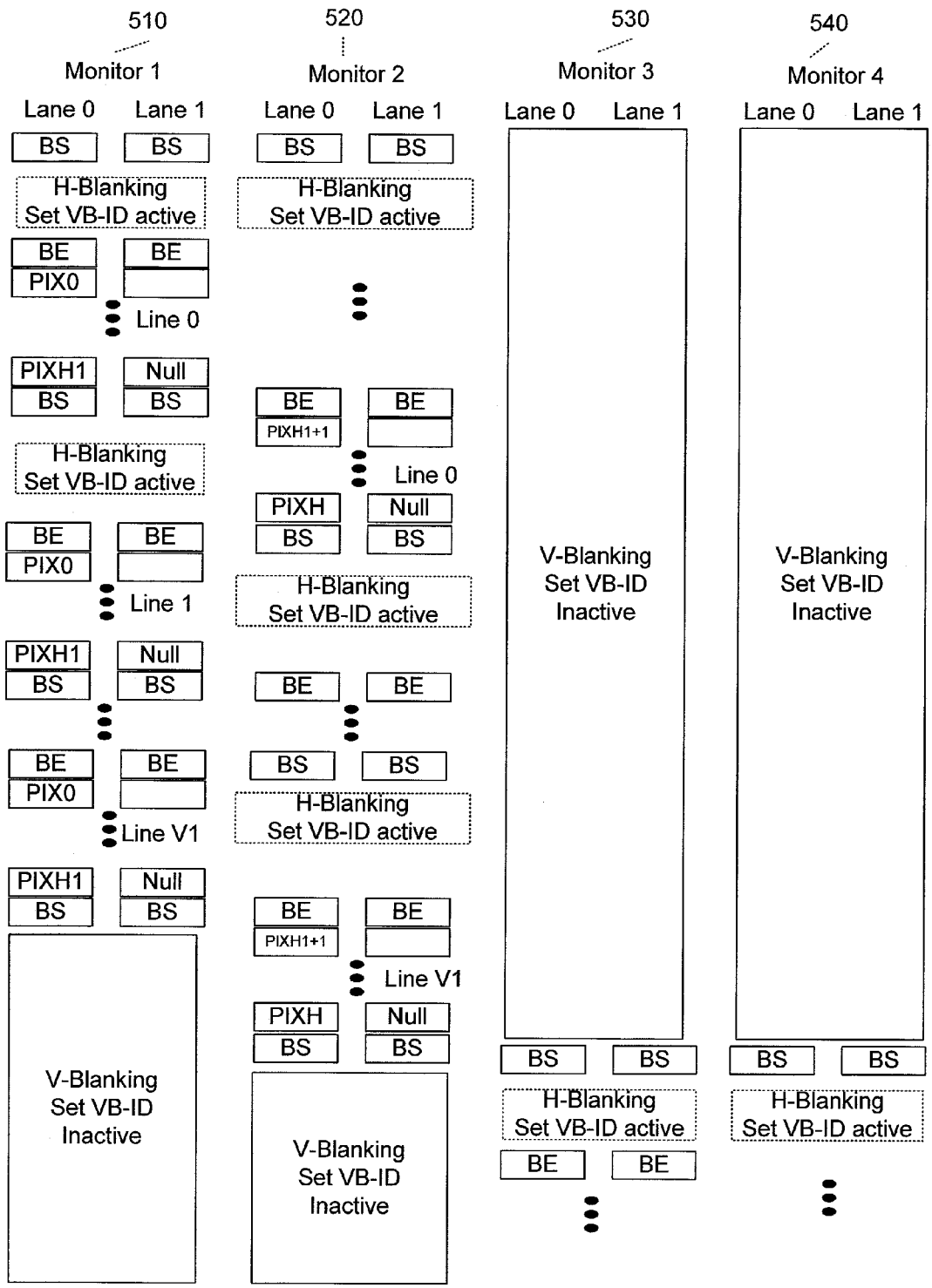
FIGS. 5A and 5B illustrate transmission data streams to the array of monitors illustrated in FIGS. 4A through 4D according to some embodiments of the present invention.
Figure 5B:
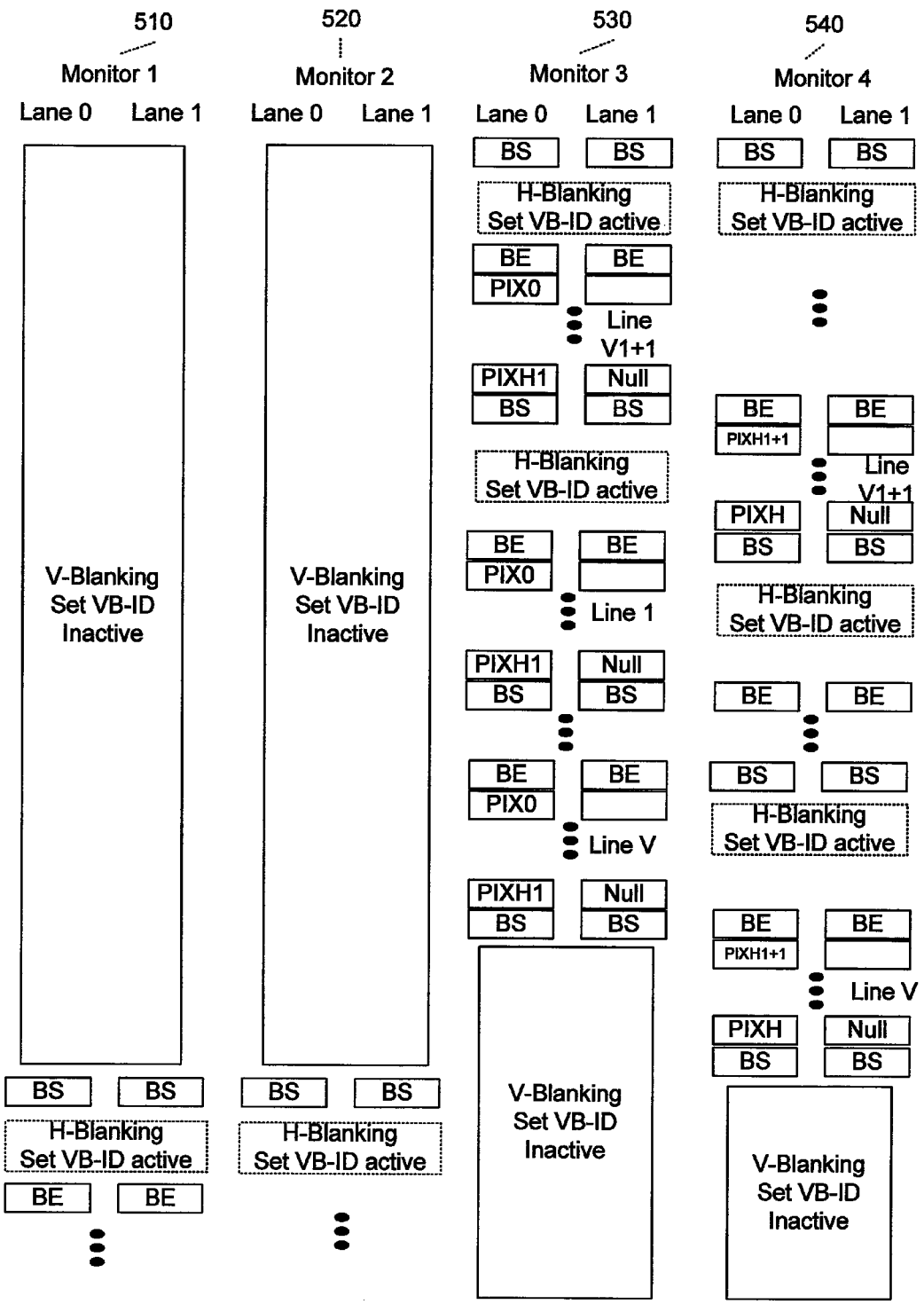

FIGS. 5A and 5B illustrate data streams to monitors 410, 420, 430, and 440 according to some embodiments of the present invention. The example illustrated in FIGS. 5A and 5B utilizes two lanes of DisplayPort compatible data to each of monitors 410, 420, 430, and 440. In general, one, two, or four lanes to each monitor may be utilized. Furthermore, there may be one, two, or four lanes of DisplayPort compatible data input to multi-monitor system 300 from which the data streams to each of monitors 410, 420, 430, and 440 is provided. Data stream 510 is directed to monitor 410, data stream 520 is directed to monitor 420, data stream 530 is directed to monitor 430, and data stream 540 is directed to monitor 440.

As shown in FIG. 5A, data streams 510 and 520 first enter a horizontal blanking period where VB-ID is set to indicate active video data. In FIG. 5A, data streams 510, 520, 530, and 540 are simultaneously clocked with each symbol in each lane transmitted in one clock period. Data streams 530 and 540 are in a vertical blanking period, with VB-ID set to indicate inactive video data, while data is being sent in data streams 510 and 520. Line 0 data is then sent in data stream 510, which includes pixel 0 through pixel H1 of the H pixels of data received by multi-monitor system 300. During the time line 0 data is being sent in data stream 510, data stream 520 is in a horizontal blanking period. Once line 0 data pixels 0 through H1 are sent to monitor 410 in data stream 510, data stream 510 enters a horizontal blanking period. Line 0 pixels H1+1 through H is then sent in data stream 520 to monitor 420. This process, where the line data is sent to one of monitors 410 or 420 while the other monitor is in a blanking period continues through transmission of line V1 data, with Line V1 data pixels 0 through H1 sent in data stream 510 to monitor 410 and line V1 data pixels H1+1 through H sent in data stream 520 to monitor 420 directly following. Data streams 510 and 520 then switch to a vertical blanking period and set VB-ID to indicate inactive video data.

As shown in FIG. 5B, data streams 510 and 520 remaining in the vertical blanking period while lines V1+1 through V of data are sent in data streams 530 and 540 to monitors 430 and 440, respectively. As data for line V1+1 pixels PIX0 through PIXH1 is sent in data stream 530 to monitor 430, data stream 540 is in a horizontal blanking period. While data for line V1+1 pixels H1+1 through H is sent in data stream 540 to monitor 440, data stream 530 is in a horizontal blanking period. This sequence continues until all of the Line V data is sent, then data streams 530 and 540 switch to a vertical blanking period by setting VB-ID to indicate inactive data.

Although FIGS. 5A and 5B illustrate transmission of data to a 2×2 array of monitors, a transmission sequence appropriate for any array of monitors with any number of monitors can be derived. As particular examples, 3840×1200 video data can be displayed on two 1920×1200 displays; a 3720×1440 video can be displayed on two 900×1440 and one 1920×1440 displays; a 5040×1050 video can be displayed on three 1680×1440 displays; and a 5760×900 video can be displayed on three 1440×900 displays. In each case, RX 302 interacts with source 100 as if it where an H×V display device and monitor system 300 directs the data stream to all of the monitors by utilizing horizontal and vertical blanking periods with the appropriate data inserted in the streams.

Image splitter 304 arranges the data for transmission to each of the D displays and provides data through multiplexer 306 to transmitters 308-1 through 308-D. Further, image splitter 304 is coupled to each of transmitters 308-1 through 308-D to control the output data streams. Image splitter 304 is further coupled to multiplexer 306 to control which of transmitters 308-1 through 308-D receives video data for transmission. For example, following data stream transmissions 510 through 540 illustrated in FIGS. 5A and 5B for transmission of a video image, image splitter 304 first directs transmitters 308-1 and 308-2 to enter a horizontal blanking phase with VB-ID set for active video data and directs transmitters 308-3 and 308-4 to be in a vertical blanking phase with VB-ID set for inactive video. Line data for monitor 410 is then sent through transmitter 308-1 while transmitter 308-2 continues to transmit a horizontal blanking phase and transmitters 308-3 and 308-4 continue to transmit a vertical blanking phase. Data for monitor 520 is then sent through transmitter 308-2 while transmitter 308-1 is directed to enter a horizontal blanking phase and transmitters 308-3 and 308-4 remain in a vertical blanking phase. Image splitter 304 continues to direct transmitters 308-1 through 308-4 until the image is completely displayed on the monitors.

From a timing standpoint, the image received at receiver 302 and the image displayed on the monitors should be coincident. Therefore, video data should be transmitted at the same rate that it is received.

Figure 6:
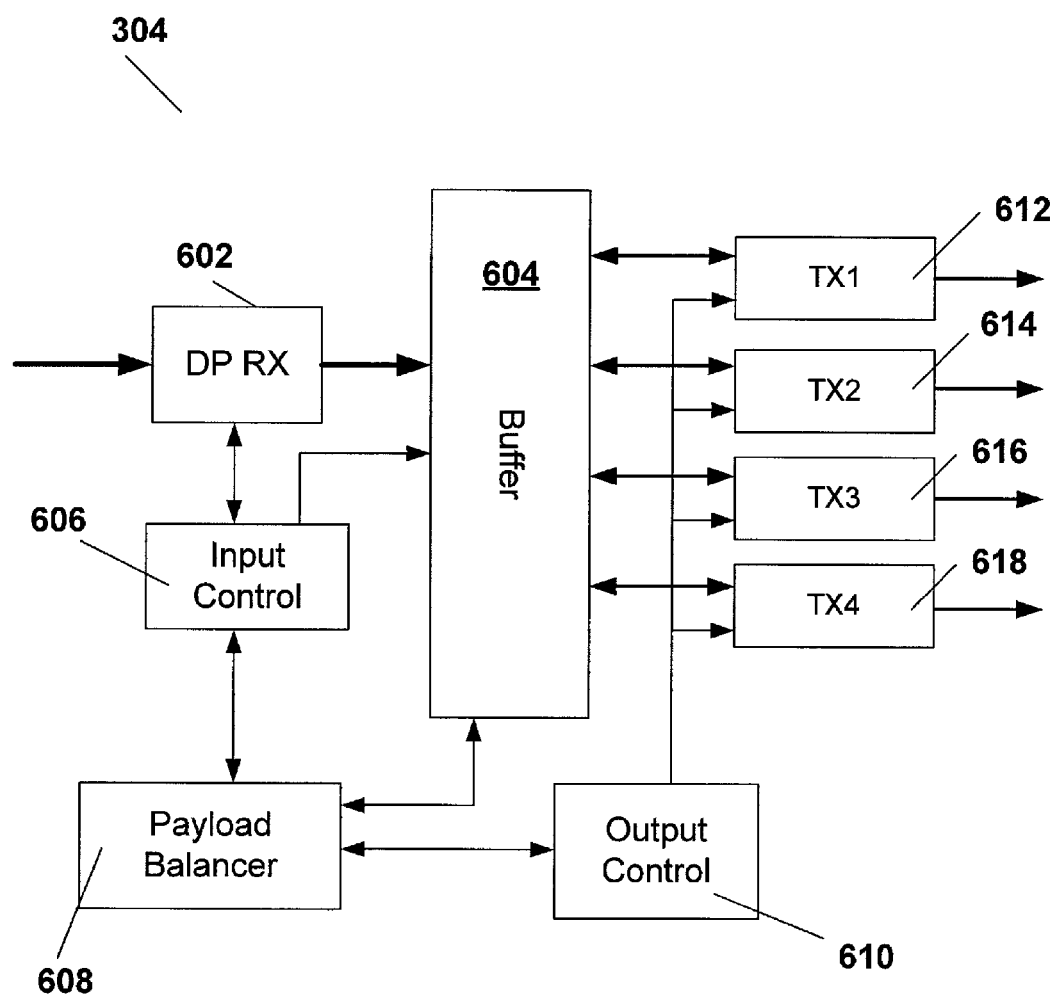
FIG. 6 illustrated an example of embodiment of splitter 304.

FIG. 6 illustrates an example embodiment of splitter 304. As shown in FIG. 6, video data is received into splitter 304 at receiver 602. As discussed above, the video data can be consistent with the DisplayPort standard. In some embodiments, as discussed above, the video data input to receiver 602 can be four lane DP data, although two lane or one lane data can also be utilized.

Receiver 602 monitors the input data streams for control signals and, when a blanking-end (BE) symbol is received, alerts input control 606 that actual video data is being received. Input control 606 is coupled to both receiver 602 and buffer 604 and controls the storage of video data into buffer 604. The video data is buffered in buffer 604 when it is received.

Data is retrieved from buffer 604 in response to signals from output control 610 by transmitter 612, transmitter 614, transmitter 616, and transmitter 618. Transmitters 612, 614, 616, and 618 retrieve video data from buffer 604 appropriate for transmission to individual monitors 410, 420, 430, and 440 as illustrated in FIGS. 4A through 4D. Output control 610, therefore, enables one of transmitters 612, 614, 616, and 618 at a time, corresponding to which of monitors 410, 420, 430, and 440 will receive the data. As such, transmitters 612, 614, 616, and 618 places data in, for example, two-lane format (although four lane format or one lane format may also be used) appropriate for transmission.

Output control 610 also provides control signals to multiplexer 306 and each of transceivers 308-1 through 308-D as shown in FIG. 3. As discussed previously, during the time that one of transceivers 308-1 through 308-D is transmitting data to a corresponding monitor, the remaining transceivers are executing a blanking period.

A payload balancer 608 can further be coupled to input control 606, output control 610, and buffer 604 to monitor the flow of data through splitter 304. In particular, payload balancer 608 may arrange that the frame timing for video data received at receiver 602 is the same as the frame timing for the video data transmitted with transmitters 612 through 618. Output control 610 can place each of transceivers 308-1 through 308-D into a blanking period if there is no data in buffer 604 to retrieve, for example. In order to provide the correct timing, receiver 602 and input control 606 may be responsive to an input timing block appropriate for the data received. Furthermore, output control 610 and transmitters 612, 614, 616, and 618 may be provided a different timing clock appropriate for the transmission of data.

In some embodiments, image splitter 304 includes a microprocessor that receives the data from receiver 302. Further, in some embodiments, a microprocessor can perform all of the functions of splitter 304.

The examples provided above are exemplary only and are not intended to be limiting. One skilled in the art may readily devise other multi-monitor systems consistent with embodiments of the present invention which are intended to be within the scope of this disclosure. As such, the application is limited only by the following claims.

What is claimed is:

1. A multi-monitor system, comprising:
    a video receiver configured to receive a video data stream (VDS) appropriate for a single monitor having a resolution of size H by V;
    a splitter operatively connected to the video receiver and configured, without using a frame buffer, to:
        partition a frame of the VDS into a plurality of portions including a first portion comprising H1 pixels and a second portion comprising H2 pixels;
        generate a first output stream comprising the first portion of the frame followed by a horizontal blanking period of size H2; and
        generate a second output stream comprising a horizontal blanking period of size H1 followed by the second portion of the frame;
    a first video transmitter (VT) operatively connected to the splitter and configure to transmit the first output stream to a first monitor having a horizontal resolution of size H1 and a vertical resolution of size V1; and
    a second VT operatively connected to the splitter and configured to configured to transmit, simultaneously with the transmission of the first output stream by the first VT, the second output stream to a second monitor having a horizontal resolution of size H2.

2. The multi-monitor system of claim 1, wherein the video receiver is a DisplayPort compatible receiver.

3. The multi-monitor system of claim 1, wherein at least one of the first VT and the second VT is a DisplayPort compatible transmitter.

4. The multi-monitor system of claim 1, wherein the splitter is further configured to:
    generate a third output stream comprising a vertical blanking period of size V1 followed by a third portion of the plurality of portions,
    wherein the third portion comprises H1 pixels.

5. A method of providing a multi-monitor display using a first video transmitter (VT) and a second VT, comprising:
    receiving a video data stream configured for a single monitor having a resolution of size H by V;
    partitioning a frame of the video data stream into a plurality of portions including a first portion comprising H1 pixels and a second portion comprising H2 pixels;
    generating a first output stream comprising the first portion of the frame followed by a horizontal blanking period of size H2; and
    generating a second output stream comprising a horizontal blanking period of size H1 followed by the second portion of the frame,
    wherein partitioning the frame, generating the first output stream, and generating the second output stream are executed without using a frame buffer,
    wherein the first VT is configured to transmit the first output stream to a first monitor having a horizontal resolution of size H1 and a vertical resolution of size V1, and
    wherein the second VT is configured to transmit the second output stream, simultaneously with transmission of the first output stream, to a second monitor having a horizontal resolution of size H2.

6. The method of claim 5, wherein receiving the video data stream includes receiving data according to the DisplayPort standard.

7. The method of claim 5, wherein transmitting the first output stream and the second output stream to the first monitor and the second monitor includes transmitting data to the first monitor and the second monitor according to the DisplayPort standard.

8. The method of claim 5, wherein H1 and H2 sum to H.

9. A display system comprising:
    a video receiver;
    a plurality of monitors including a first monitor having a horizontal resolution of size H1 and a vertical resolution of size V2, and a second monitor having a horizontal resolution of size H2; and
    an image splitter configured, without using a frame buffer, to:
        receive a video data stream (VDS) from the video receiver for display on a single monitor having a resolution of size H by V;
        partition a frame of the VDS into a plurality of portions including a first portion comprising H1 pixels and a second portion comprising H2 pixels;
        generate a first output stream comprising the first portion of the frame followed by a horizontal blanking period of size H2; and
        generate a second output stream comprising a horizontal blanking period of size H1 followed by the second portion of the frame,
        wherein the image splitter directs the first monitor and the second monitor of the plurality of monitors to simultaneously output the first output stream and the second output stream, respectively, without using a frame buffer.

10. The multi-monitor system of claim 4, further comprising:
    a third VT operatively connected to the splitter and configured to transmit, simultaneously with the transmission of the first output stream by the first VT, the third output stream to a third monitor having a horizontal resolution of H1 and located below the first monitor.

11. The multi-monitor system of claim 10, wherein the third monitor has a vertical resolution of V2, and wherein V exceeds a sum of V1 and V2.

12. The multi-monitor system of claim 11, wherein the first output stream comprises a vertical blanking period of size V2 after the horizontal blanking period of size H2, and wherein the second output stream comprises a vertical blanking period of V2 after the second portion of the frame.

13. The multi-monitor system of claim 1, wherein H1 and H2 sum to H.

14. The multi-monitor system of claim 1, wherein H exceeds a sum of H1 and H2.

15. The method of claim 5, further comprising:
generating a third output stream comprising a vertical blanking period of size V1 followed by a third portion of the plurality of portions, wherein the third portion comprises H1 pixels,
wherein the third output stream is transmitted to a third monitor having a resolution of size H1 and located below the first monitor.

16. The method of claim 15, wherein the third monitor has a vertical resolution of V2.

17. The method of claim 16, wherein the first output stream comprises a vertical blanking period of size V2 after the horizontal blanking period of size H2, and wherein the second output stream comprises a vertical blanking period of V2 after the second portion of the frame.

18. The method of claim 5, wherein H exceeds a sum of H1 and H2.

19. The display system of claim 9, further comprising:
a third monitor having a horizontal resolution of H1 and a vertical resolution of V2,
wherein the first output stream further comprises a vertical blanking period of size V2 after the horizontal blanking period of size H2,
wherein the second output stream further comprises the vertical blanking period of size after the second portion of the frame, and
wherein the image splitter is further configured to:
generate a third output stream comprising a vertical blanking period of size V1 followed by a third portion of the frame, wherein the third portion comprises H1 pixels; and
direct the third monitor to output the third output stream while the first monitor and the second monitor output the first output stream and the second output stream.

* * * * *